US008643855B2

(12) United States Patent
Ushiku

(10) Patent No.: US 8,643,855 B2
(45) Date of Patent: Feb. 4, 2014

(54) IMAGE FORMING SYSTEM AND METHOD OF CONTROLLING THE IMAGE FORMING SYSTEM FOR PERFORMING IMAGE FORMATION BY COMBINATION OF AN INFORMATION PROCESSING APPARATUS, AN IMAGE SUPPLY APPARATUS, AND AN IMAGE FORMING APPARATUS

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1366 days.

(21) Appl. No.: 12/036,815

(22) Filed: Feb. 25, 2008

(65) Prior Publication Data

US 2008/0204800 A1    Aug. 28, 2008

(30) Foreign Application Priority Data

Feb. 26, 2007    (JP) .................................. 2007-046296

(51) Int. Cl.
*G06F 3/12* (2006.01)
(52) U.S. Cl.
USPC ........................................................ 358/1.13
(58) Field of Classification Search
USPC ........................ 358/1.1, 1.13, 1.15
See application file for complete search history.

(56) References Cited

U.S. PATENT DOCUMENTS

| 6,553,431 | B1* | 4/2003 | Yamamoto et al. | 710/8 |
| 6,917,437 | B1* | 7/2005 | Myers et al. | 358/1.15 |
| 2003/0020949 | A1* | 1/2003 | Goto | 358/1.15 |
| 2003/0090697 | A1* | 5/2003 | Lester et al. | 358/1.14 |
| 2004/0172586 | A1* | 9/2004 | Ragnet et al. | 715/500 |
| 2005/0050466 | A1* | 3/2005 | Sangroniz et al. | 715/526 |

FOREIGN PATENT DOCUMENTS

JP    200047771 A    2/2000

* cited by examiner

*Primary Examiner* — Jeremiah Bryar
(74) *Attorney, Agent, or Firm* — Canon U.S.A., Inc. IP Division

(57) ABSTRACT

An image forming system includes a selection unit configured to select an image supply apparatus for supplying image data and an image forming apparatus for forming an image based on the image data, a specification setting unit configured to set image formation specifications for image formation in the image forming apparatus selected by the selection unit, and a transmitting unit configured to transmit identification information generated to identify the image formation specifications set in the specification setting unit to the image supply apparatus selected by the selection unit.

7 Claims, 10 Drawing Sheets

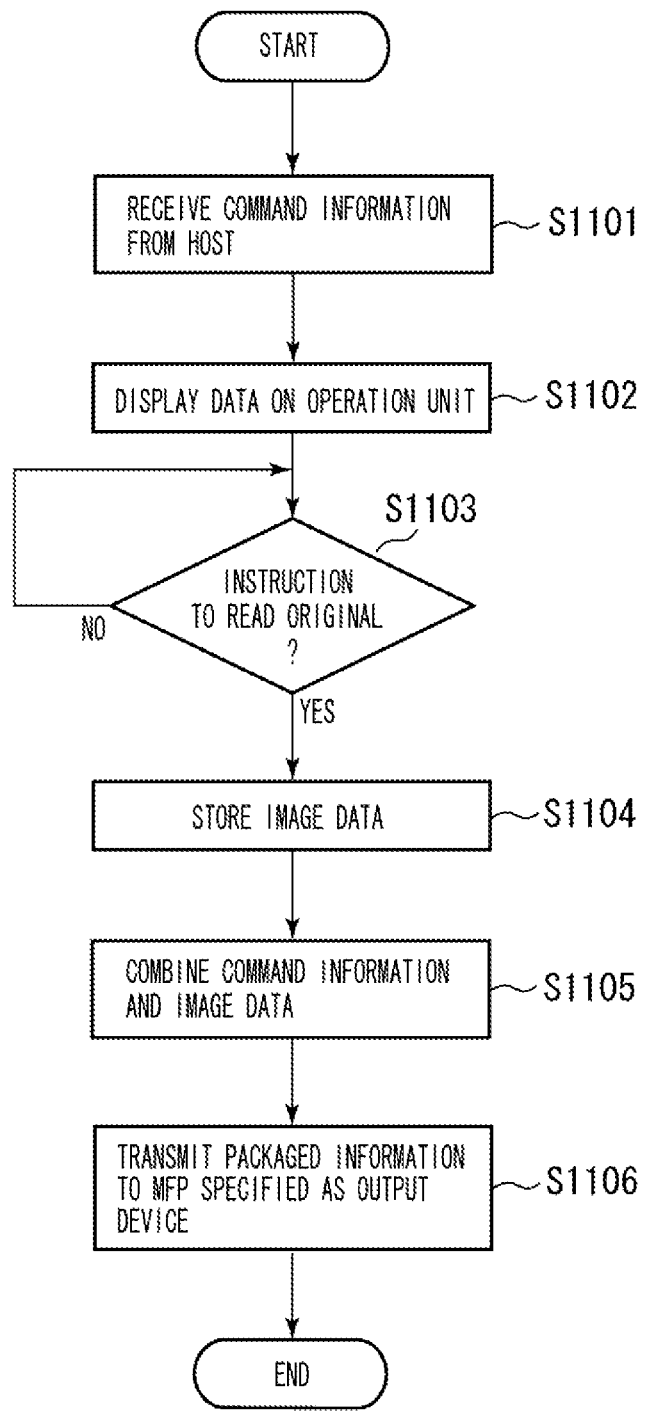

IMAGE FORMING SYSTEM AND METHOD OF CONTROLLING THE IMAGE FORMING SYSTEM FOR PERFORMING IMAGE FORMATION BY COMBINATION OF AN INFORMATION PROCESSING APPARATUS, AN IMAGE SUPPLY APPARATUS, AND AN IMAGE FORMING APPARATUS

BACKGROUND OF THE INVENTION

1. Field of the Invention

The present invention relates to an image forming system including an image supply apparatus and an image forming apparatus that are connected together via a network, and a method of controlling the image forming system.

2. Description of the Related Art

Conventionally, an image processing system including an image supply apparatus and an input/output device connected together via a communication medium is widely used. Such a system perform various functions by connecting, for example, an input device such as a digital camera or a scanner as an image supply apparatus, and an image output device such as a printer or a facsimile machine via a network. A multifunction peripheral (MFP) is known as a device equipped with the above image supply function and image output function. An MFP of a simple structure with no binding or staple function and another MFP of an advanced structure with a binding or staple function, for example, can be both used at a place. In this case, the first MFP is used in a case of simple printing. If the binding function is required, the second MFP having an advanced function is used for printing and binding. Typical examples of such cases include the following two patterns.

In a first pattern, a user sets a target original on the first MFP with no binding or stable function and instructs the first MFP to send the original data to a host computer. When the data is received, the host computer searches for another advanced-function printer on the network to instruct the printer to print the data. In this way, advanced copying can be performed.

In a second pattern, the user of the first MFP designates a destination of the read original data via an operation panel of the first MFP. As a result, the original data read by the first MFP is sent to the second MFP serving as the designated destination device that prints the data and realizes advanced copying. Japanese Patent Application Laid-Open No. 2000-47771 discusses a technique of collecting information from input/output devices on a network, summarizing processes executable with the input/output devices in the form of transfer path profile, and sending the transfer path profile to each device to perform a desired function.

As for the above first pattern, however, the user needs to perform a troublesome operation with the host computer in every advanced copying. This involves a lot of time and causes the inconvenience to the user.

As for the second pattern, the user has to operate the second MFP having the advanced function via the operation panel of the first MFP that has no binding or stable function. Thus, the operation panel of the first MFP needs to have an advanced function similar to the second MFP having the advanced function, which results in increasing a cost of the first MFP that has no binding or stable function.

SUMMARY OF THE INVENTION

The present invention is directed to a technique capable of setting image formation specifications in an image forming apparatus with ease irrespective of an image formation specifications setting function of an image supply apparatus.

According to an aspect of the present invention, an image forming system includes, a selection unit configured to select an image supply apparatus for supplying image data and an image forming apparatus for forming an image based on the image data, a specification setting unit configured to set image formation specifications for image formation in the image forming apparatus selected by the selection unit, and a transmitting unit configured to transmit identification information generated to identify the image formation specifications set in the specification setting unit to the image supply apparatus selected by the selection unit, wherein the image supply apparatus transmits identification information selected from the identification information transmitted by the transmitting unit and image data, and the image forming apparatus forms an image based on image formation specifications that are identified using the identification information sent from the image supply apparatus and the image data.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a flowchart illustrating processing performed in an MFP designated as an input device.

DETAILED DESCRIPTION OF THE EMBODIMENTS

Various exemplary embodiments, features, and aspects of the invention will be described in detail below with reference to the drawings.

Figure 1:
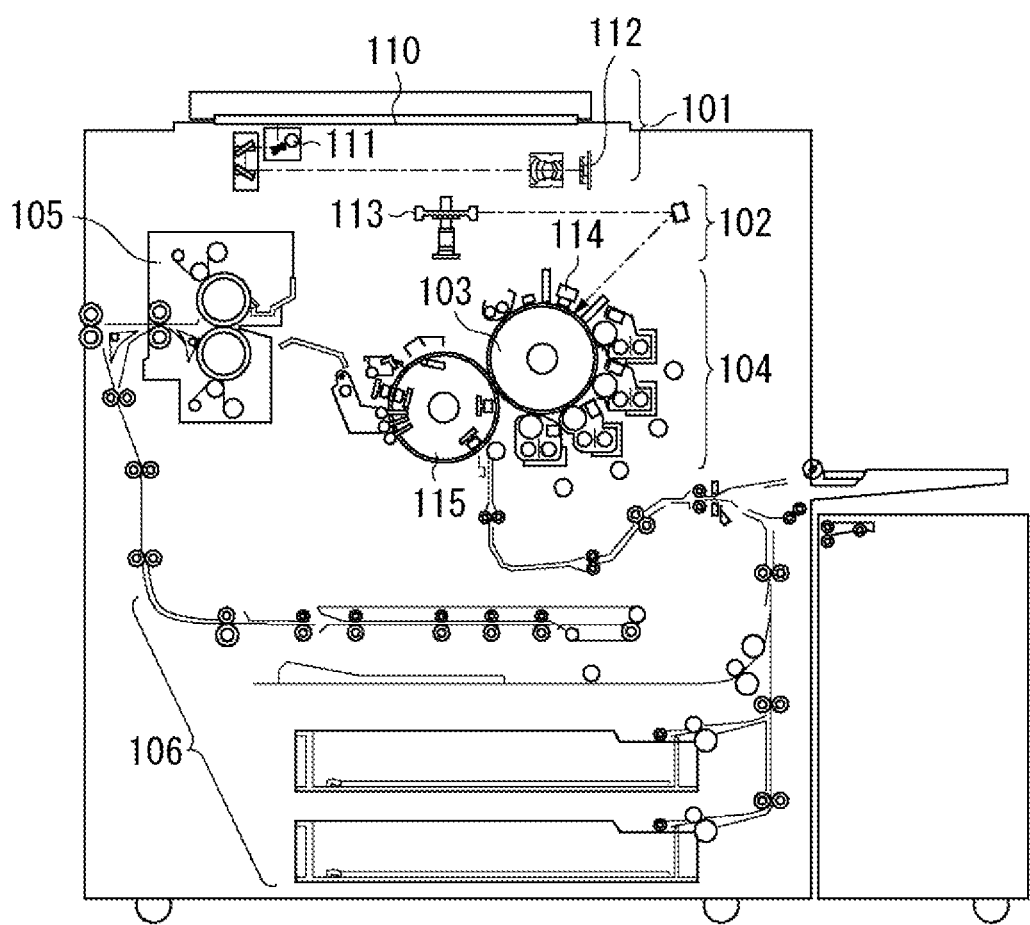
FIG. 1 is a sectional view illustrating a structure of an MFP according to an exemplary embodiment of the present invention.

Referring to FIG. 1, first, structures of an MFP, a laser beam printer, and an inkjet printer as suitable exemplary embodiments of the present invention are described. A printing apparatus (image forming apparatus) of the exemplary embodiment is not limited to the MFP, the laser beam printer, and the inkjet printer. A printing apparatus based on another printing system may also be used.

FIG. 1 is a sectional view illustrating a structure of the MFP according to the exemplary embodiment of the present invention that is a one-drum (1D) color MFP.

The MFP includes a scanner unit 101, a laser exposure unit 102, a photosensitive drum 103, an image forming unit 104, a fixing unit 105, a sheet feeding/conveying unit 106, and a printer control unit (not illustrated) for controlling these units. The scanner unit 101 applies light of a light source 111 onto an original placed on a document positioning plate 110 and guides reflected light from the original to a charged coupled device (CCD) sensor 112 through a lens. The CCD sensor 112 optically reads the original to convert the original image into electric signals and generate image data.

The laser exposure unit 102 applies a light beam modulated according to the image data, such as laser light, to a polygonal mirror 113 rotating at a constant angular speed, and irradiates the photosensitive drum 103 with the light beam of the reflected scanning light.

The image forming unit 104 rotates the photosensitive drum 103 and charges the drum with a charging device 114, and then develops latent images of each color formed on the photosensitive drum 103 by the laser exposure unit 102 using toner of a corresponding color. In this way, toner images of each color formed on the photosensitive drum 103 are sequentially transferred to a sheet wound around the transfer drum 115.

At this time, fine particles of residual toner on the photosensitive drum 103 are recovered by a cleaning device (not shown). In the case of forming a four-color image, a sheet is wound on a predetermined portion of the transfer drum 115 and the transfer drum 115 makes four revolutions. During the rotation, developing units (developing stations) containing magenta (M) toner, cyan (C) toner, yellow (Y) toner, and black (K) toner execute the above electrophotographic process in turn. After the transfer drum 115 make four revolutions, the sheet having the full-color (four-color) toner images transferred thereto is separated from the transfer drum 115 and conveyed to the fixing unit 105.

The fixing unit 105 includes a combination of a roller and a belt. Further, the fixing unit 105 includes a built-in heat source (e.g., a halogen heater) to melt and fix toner of the toner image that has been transferred to the sheet, with heat and pressure in the image forming unit 104.

The sheet feeding/conveying unit 106 includes at least one sheet storage box typified by a sheet cassette or a paper deck. The unit picks up one sheet from a plurality of sheets in the sheet storage box and transfers the sheet to the image forming unit 104 and the fixing unit 105 in response to an instruction from the printer control unit.

The sheet is wound around the transfer drum 115 of the image forming unit 104 and then transferred to the fixing unit 105 after four revolutions. While the transfer drum 115 makes four revolutions, the above-described toner images of YMCK colors are transferred to the sheet. Further, in the case of forming an image on both sides of the sheet, the printer control unit controls and guides the sheet having passed the fixing unit 105 again through a conveyance path to the image forming unit 104.

The printer control unit communicates with the MFP control unit for controlling the entire MFP, and executes control according to an instruction of the MFP control unit. Further, the printer control unit monitors the states of the scanner unit 101, the laser exposure unit 102, the image forming unit 104, the fixing unit 105, and the sheet feeding/conveying unit 106 while issuing instructions to perform smooth and cooperative operations.

Figure 2:
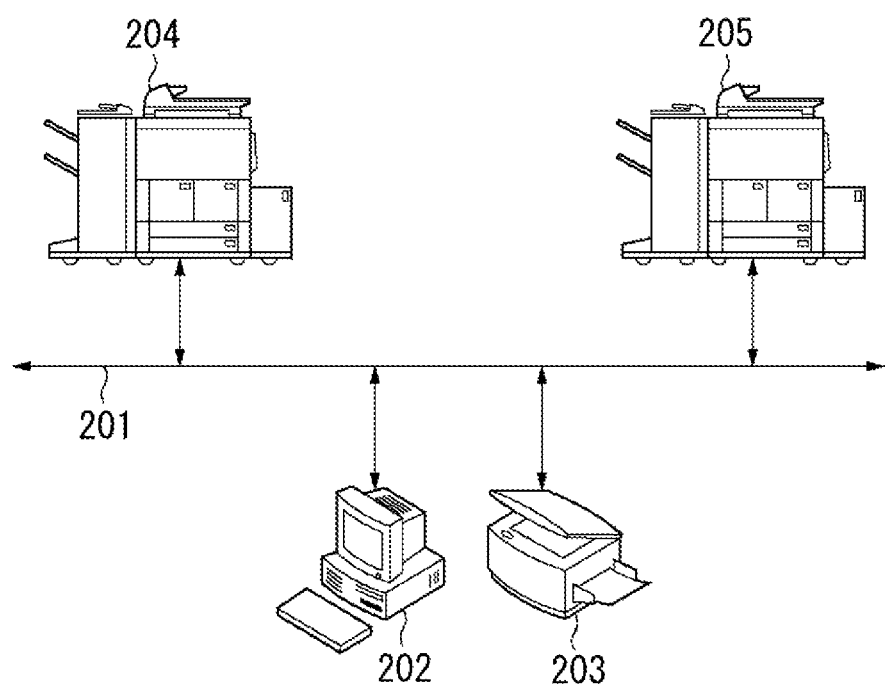
FIG. 2 is a diagram illustrating a configuration of a printing system according to an exemplary embodiment of the present invention.

FIG. 2 illustrates a configuration of a printing system (image forming system) according to the exemplary embodiment of the present invention.

In FIG. 2, a network 201 is configured based on an existing technique of connecting devices. In the present embodiment, the network is an Ethernet® network based on a transmission control protocol/Internet protocol (TCP/IP). A user terminal (information processing apparatus) 202, performs processing such as generating a document.

In addition, the user terminal 202 includes a network interface and is connected to various devices (203 to 205) via the network 201. The user terminal 202 receives information from each device or controls each device via the network 201. A host computer is an example of the user terminal 202.

Multifunction peripherals (MFPs) 203, 204, and 205 include a network interface and are connected to other devices via the network 201. The MFPs 203, 204, and 205 transmit/receive print data via the network 201, and print the received data on a recording sheet, such as recording paper, employing an existing printing technique such as electrophotography.

MFP 203 is a less sophisticated, i.e., fewer features, MFP than MFPs 204 and 205. The present embodiment assumes that data transmitted/received between the MFPs can be printed (image formation), and any descriptions associated with printing, such as conversion of the data to a page-description language (PDL), is omitted herein.

Figure 3:
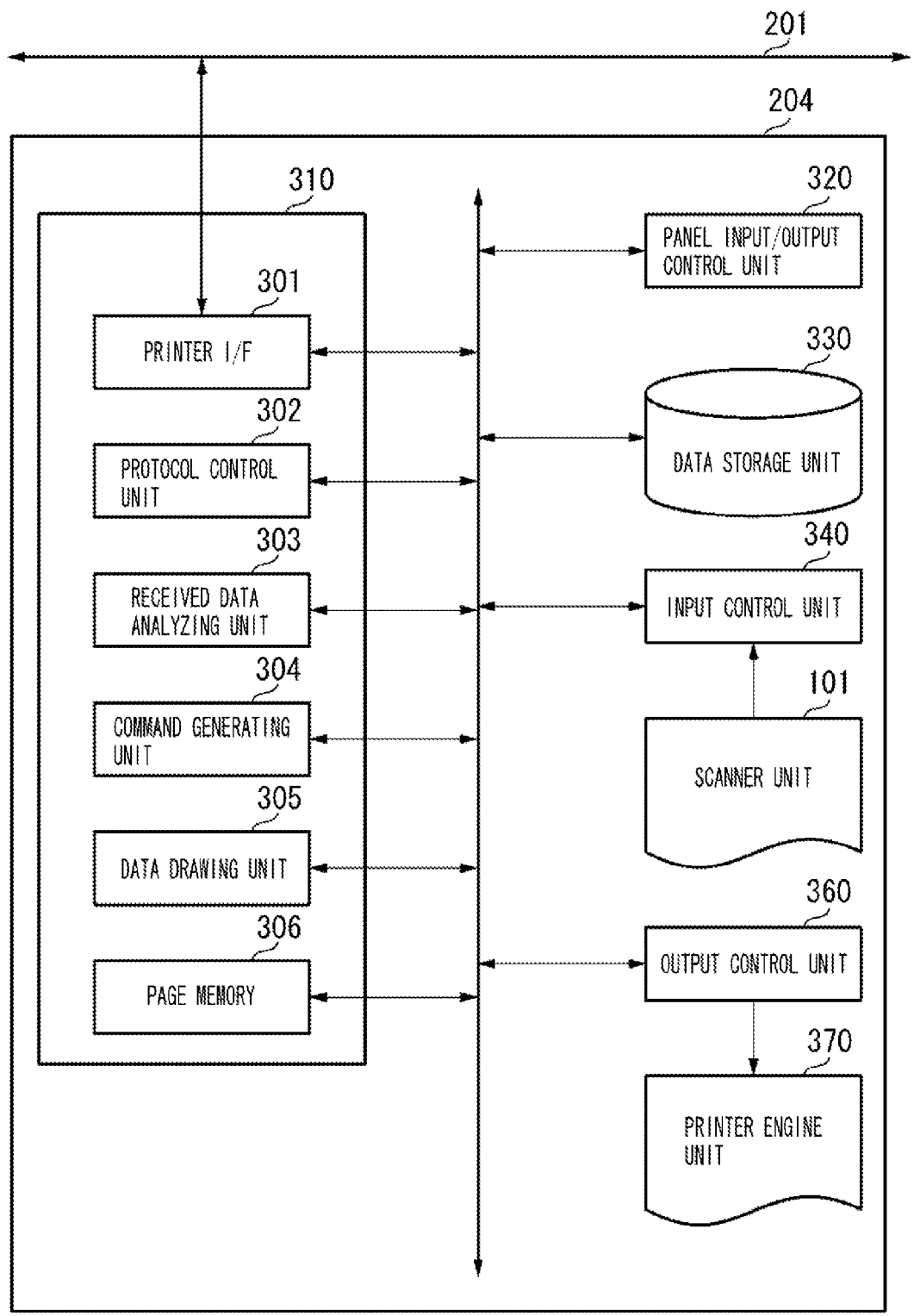
FIG. 3 is a block diagram illustrating a functional configuration of an MFP according to an exemplary embodiment of the present invention.

FIG. 3 is a block diagram illustrating a functional configuration of an MFP according to the exemplary embodiment of the present invention. In FIG. 3, the MFP includes a formatter control unit 310, a panel input/output control unit 320, a data storage unit 330, an input control unit 340, a scanner unit 101, an output control unit 360, and a printer engine (image formation unit) 370.

The formatter control unit 310 includes a printer interface unit 301, a protocol control unit 302, a received data analyzing unit 303, a command generating unit 304, a data drawing unit 305, and a page memory 306.

The printer interface unit 301 is connected to the network 201 to transmit/receive data to/from any external device. The protocol control unit 302 analyzes a network protocol to communicate with any external device. The received data analyzing unit 303 analyzes received data to identify processing to be performed on the received data.

The command generating unit 304 generates a processing command in response to a request from an external device. The data drawing unit 305 generates bitmapped data in response to the command. The page memory 306 stores the bitmapped data generated by the data drawing unit 305. The panel input/output control unit 320 controls a user's operation of inputting/outputting on an operation panel of the MFP.

The data storage unit 330 stores received data or command data, and includes, for example, a secondary storage such as a hard disk. In general, the formatter control unit 310 is realized by a computer system using a central processing unit (CPU), a read only memory (ROM), and a random access memory (RAM).

The input control unit 340 receives input data from the scanner unit 101. As described above with reference to FIG. 1, the scanner unit 101 reads an original to generate image signals. The output control unit 360 converts data in the page memory 306 into video signals to transfer an image to the printer engine unit 370. The printer engine unit 370 includes the laser exposure unit 102, the image forming unit 104, the fixing unit 105, and the sheet feeding/conveying unit 106 of FIG. 1 and forms an image on a recording sheet based on the received video signals.

Figure 4:
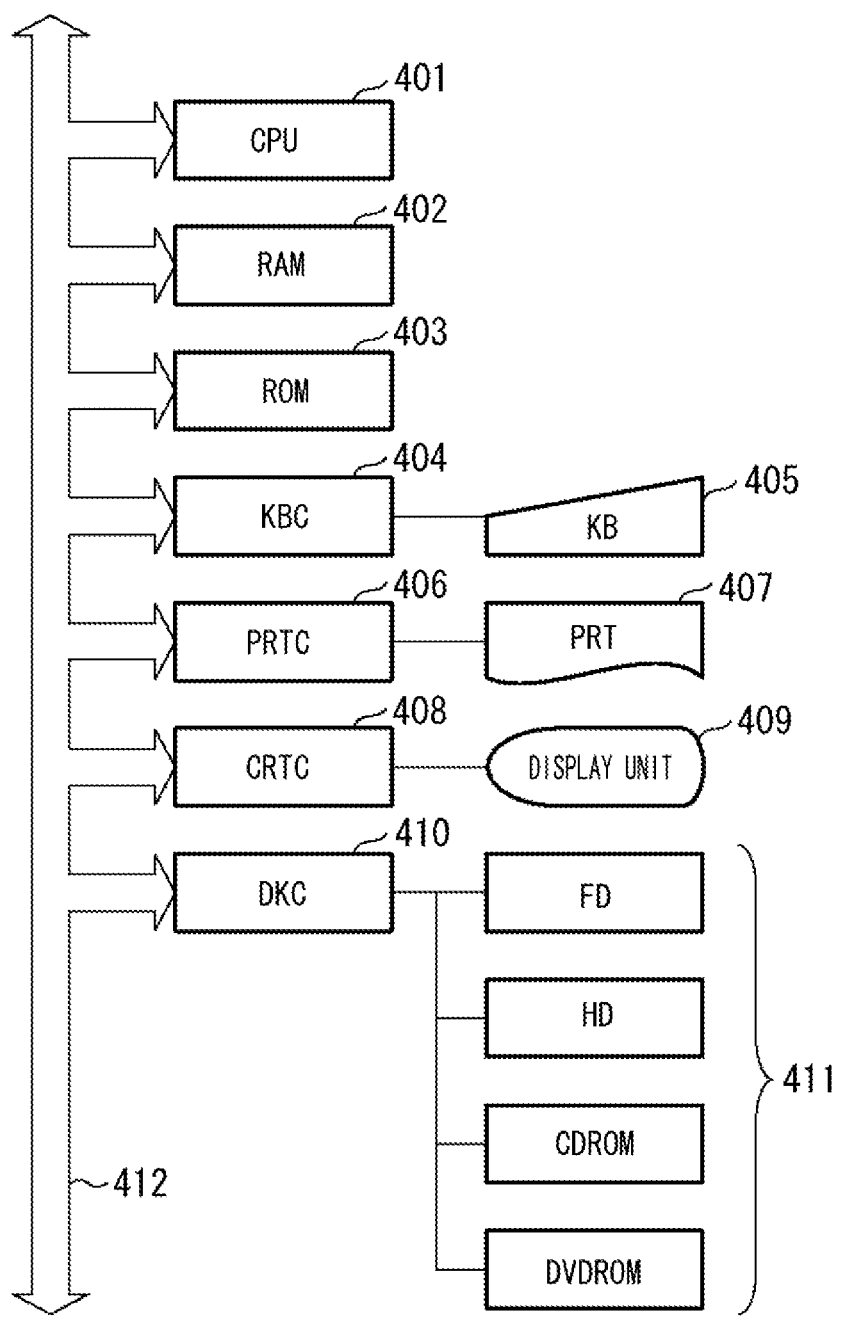
FIG. 4 is a block diagram illustrating a basic configuration of a host (user terminal: personal computer (PC)) according to an exemplary embodiment of the present invention.

FIG. 4 is a block diagram illustrating a basic configuration of the user terminal (host computer) 202 according to the present embodiment. In FIG. 4, a CPU 401 controls the user terminal 202 and performs calculation processing according to a program loaded onto a RAM 402. The RAM 402 is an area where programs and data are loaded and executed in each processing.

A ROM 403 is a storage area for storing a system control program or font data. A keyboard control unit (KBC) 404 receives data in response to key input from a keyboard (KB) 405 and transmits the data to the CPU 401. A printer control unit (PRTC) 406 controls a printer device 407 (PRT). The printer device 407 may be an MFP, a laser beam printer, or an inkjet printer.

A display control unit 408 controls data displayed on a display unit 409. A disk control unit (DKC) 410 controls data transfer. An external storage device 411 is, for example, a floppy disk (FD), a hard disk (HD), a compact disk (CD) (CDROM), or a digital versatile disk (DVD) (DVDROM). The external storage device 411 stores programs and data. At the time of executing program, the external storage device 411 refers to the program or loads the program onto the RAM 402 if necessary. A system bus 412 serves as a path for data transfer between the above-described components.

The user terminal 202 is driven by the CPU 401 that executes a basic input/output (I/O) program, an operating system (OS), and a command generation control program. The basic I/O program is stored in the ROM 403, and the OS is written to the HD 411. When the user terminal 202 is powered on, an OS is read from the HD 411 to the RAM 402 by an initial program loading (IPL) function of the basic I/O program to start operating.

Figure 5:
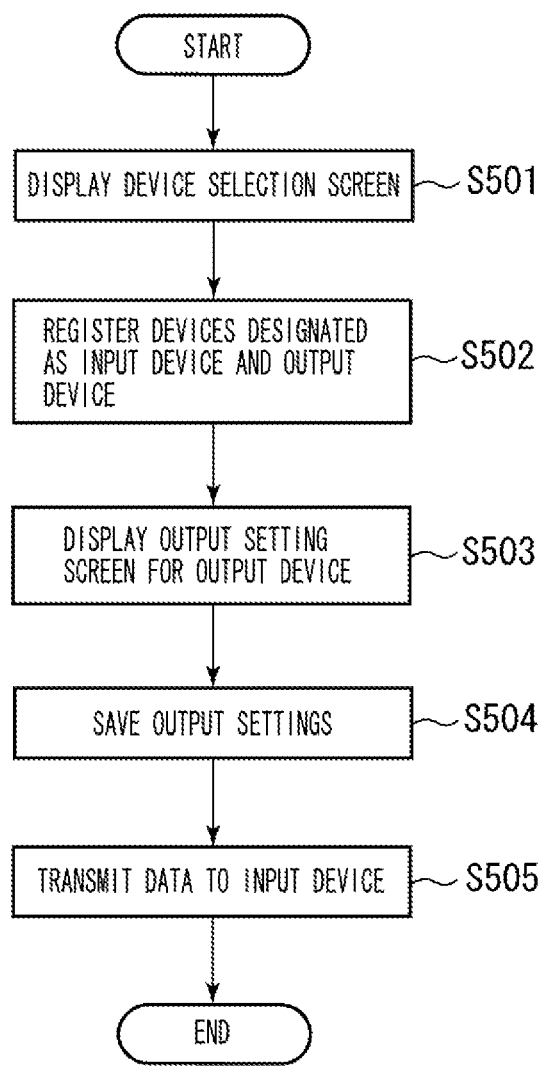
FIG. 5 is a flowchart illustrating command generation processing executed by a user terminal according to an exemplary embodiment of the present invention.

FIG. 5 is a flowchart illustrating command generation processing executed by the user terminal 202 according to the present embodiment. A program for executing this processing is loaded to the RAM 402 and executed under the control of the CPU 401.

Figure 6:
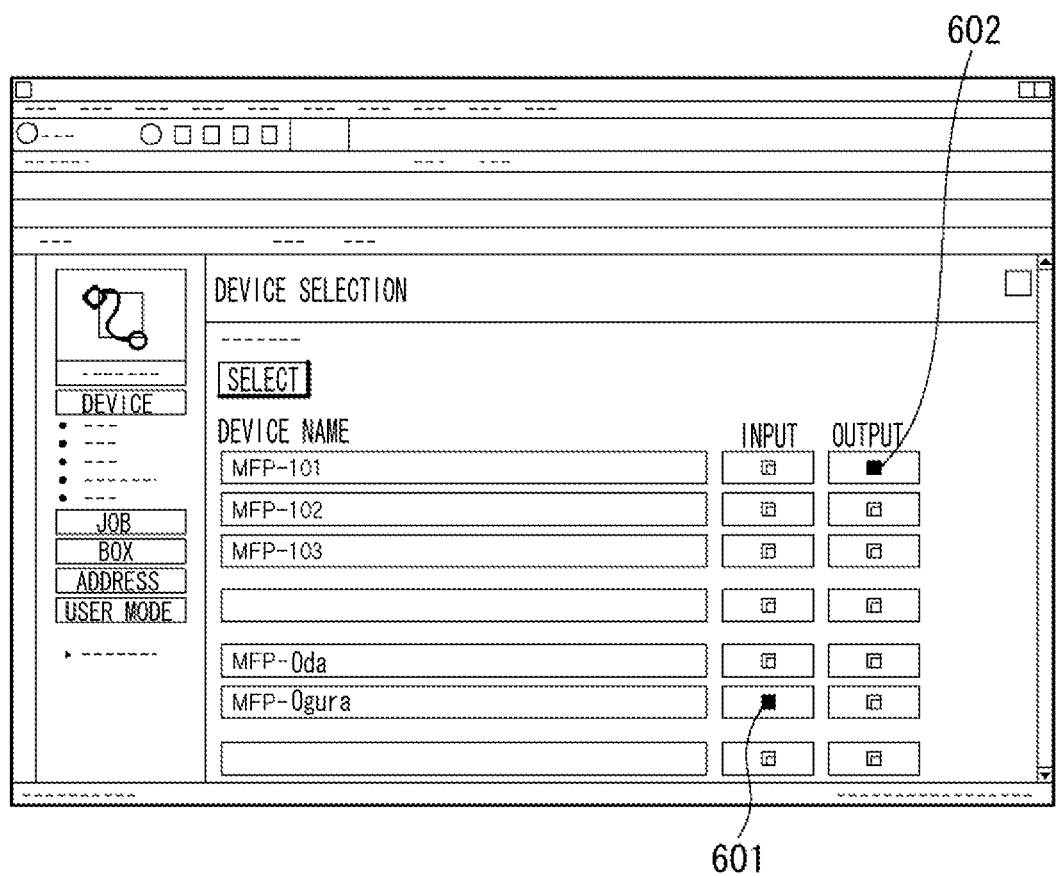
FIG. 6 illustrates a screen example that displays a list of MFPs connected to a network according to an exemplary embodiment of the present invention.

First, in step S501, the CPU 401 displays, for example, a device selection screen of FIG. 6 on the display unit 409. In this example, a list of available devices (MFPs) connected to the network 201 is displayed. In step S502, if a user designates an input device and an output device using this screen, the CPU 401 then stores information about the designated devices.

FIG. 6 illustrates a screen example that displays a list of MFPs connected to the network 201. In the example of FIG. 6, an "MFP-Ogura" is designated as an MFP (image supply apparatus) to receive original data (601). Further, an "MFP-101" is designated as an output device (602).

In step S503, the CPU 401 displays a screen for output settings (print conditions, post-processing conditions, etc.) in the MFP on the display unit 409, based on functional information of the MFP that is designated as an output device. The functional information may be directly received from the MFP designated as an output device, or functions of each device may also be previously registered.

Figures 7, 8:
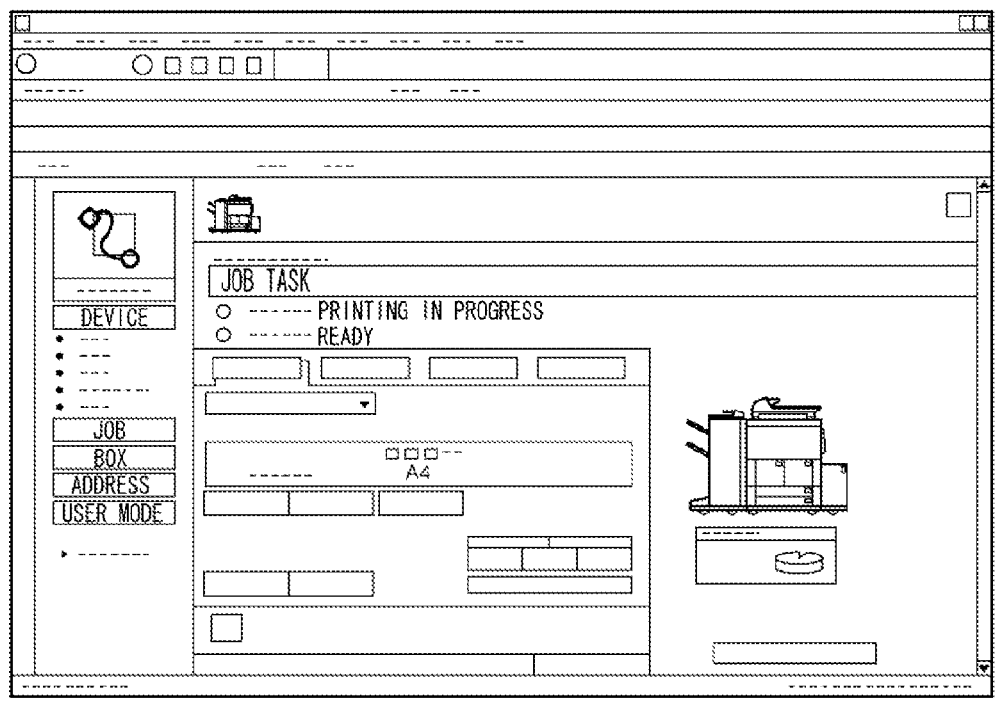
FIG. 7 illustrates a screen example displayed on a display unit of a user terminal for print settings in an MFP designated as an output device according to an exemplary embodiment of the present invention.
FIG. 8 illustrates command information stored in an MFP selected as an input device.

FIG. 7 illustrates a screen example displayed on the display unit 409 of the user terminal 202 for print settings in the MFP designated as an output device. In this example, an (common) operation screen similar to the screen displayed in an operation unit of the panel input/output control unit 320 of the "MFP-101" designated as an output device is displayed on the display unit 409 of the user terminal 202.

A user can make output settings (settings of specifications of image formation processing), such as settings of a paper size, the number of copies, binding/printing processing, staple processing, image zoom processing, and layout in the "MFP-101" designated as an output device with this screen.

In this example, the "MFP-101" is designated as an output device, a print paper size is set to "A4", a layout is set to "2-in-1", print orientation is set to "landscape", a staple condition is set to "saddle stitch", and the number of copies is set to "3".

In step S504, the CPU 401 stores output settings determined in step S503 and generates an output command corresponding to the settings. In step S505, the CPU 401 notifies a user of command identification information (ID) for identifying an output command generated in step S504. As a notifying method, for example, the command ID is displayed on the screen of the user terminal 202. Then, the CPU 401 sends the output command to the "MFP-Ogura" selected as an input device in step S501.

The "MFP-Ogura" analyzes data received from the user terminal 202 using the received data analyzing unit 303 and stores the data as a command in the data storage unit 330. In the examples of FIGS. 6 and 7, the user terminal 202 is used, but MFPs may also perform the above operations with each other instead of communication thorough the user terminal 202.

FIG. 8 illustrates command information stored in the MFP selected as an input device. In the example of FIG. 8, the CPU 401 stores command information stored in the data storage unit 330 of the MFP that is designated as an input device in a table form. A unique command ID is assigned to each command information. The command information includes, for example, information about an output format or settings such as an output device, a paper size, a layout, a staple condition, and the number of copies.

The "MFP-Ogura" designated as an input device can send the print instruction based on the command information when a user selects a command ID corresponding to the above command information in the operation panel of the "MFP-Ogura".

Figure 9:
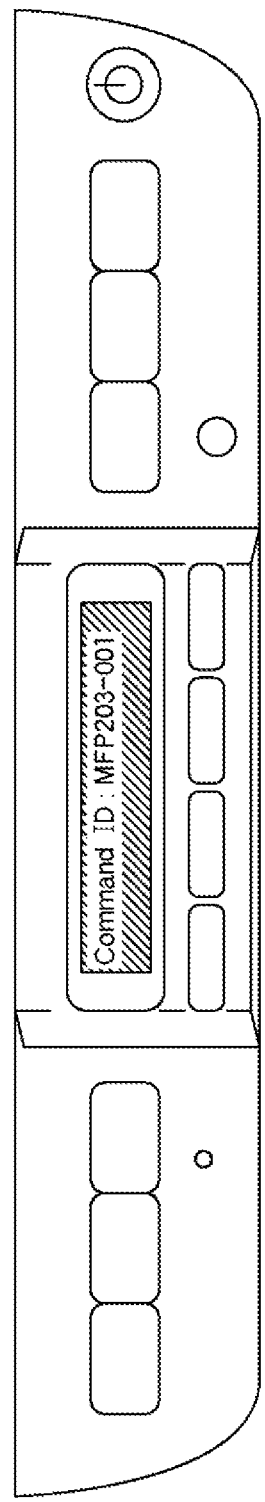
FIG. 9 is an external view of an operation panel of an MFP designated as an input device.

FIG. 9 is an external view of the operation panel of the MFP designated as an input device. As an example, FIG. 9 illustrates an operation unit of the MFP 203 of FIG. 2. The operation unit includes a liquid crystal display (LCD), a light emitting diode (LED), and button switches. The operation unit can display characters or simple images. In this example, command ID "MFP203-001" selected from the command ID table of FIG. 8 is displayed on the display unit.

Figure 10:
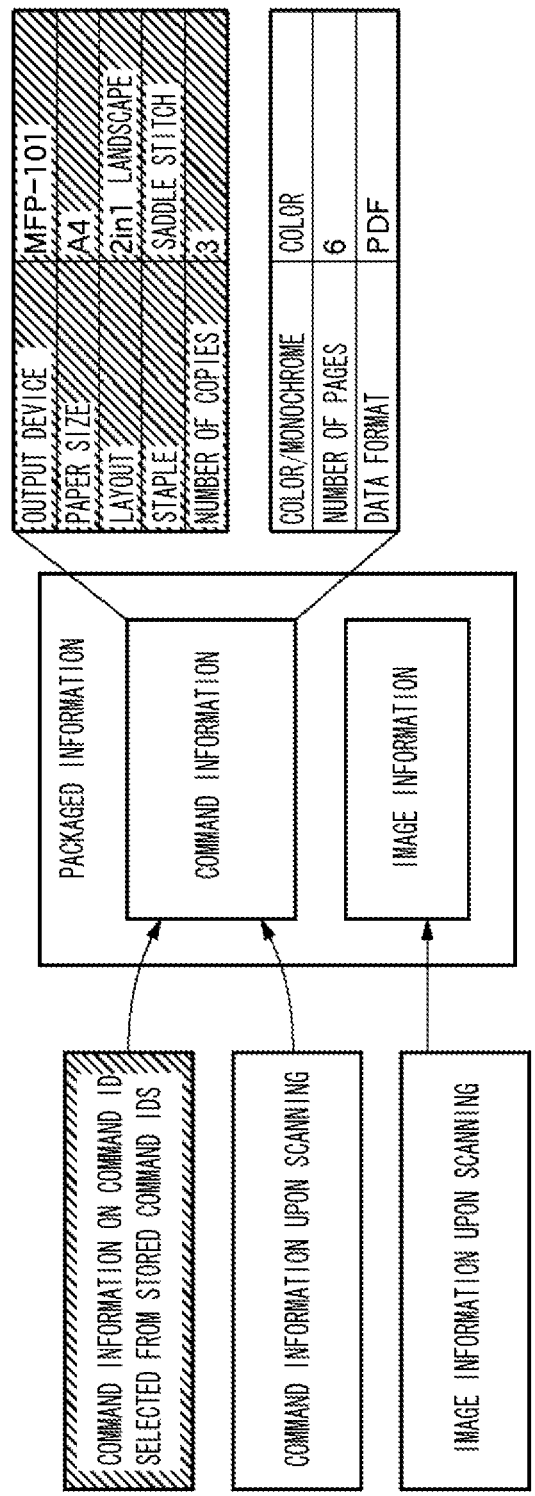
FIG. 10 illustrates how to generate command information in an MFP designated as an input device.

FIG. 10 illustrates how to generate command information in the MFP designated as an input device. The MFP designated as an input device (e.g., MFP 203) combines the selected command ID and command information set when scanning to generate a print command. Further, the MFP 203 packages image data scanned by a scanner unit of the MFP 203 and the above command information to generate a print job. Then, the MFP 203 transmits the print job to an MFP designated as an output device (in the above example, MFP-101) through the network 201.

As a result, the MFP designated as an output (image formation) device receives the print job and analyzes the print job with the received data analyzing unit 303. The MFP processes the image data included in the print job based on command information and performs a designated printing process.

FIG. 11 is a flowchart illustrating processing in an MFP designated as an input device. First, in step S1101, the MFP receives command information sent from the user terminal 202. In step S1102, according to information selected by a user from among the stored command information, the MFP displays the command ID corresponding to the command information, on a display unit of an operation unit (see FIG. 9).

In step S1103, the MFP waits for issuance of an instruction for reading an input target (supply target) original with the scanner unit 101 in order to execute a command corresponding to the command information. If the instruction for reading is issued (YES in step S1103), the MFP reads and photoelectrically converts the read image data, and stores the converted image data in the data storage unit 330 in step S1104.

At this time, the MFP stores attributes (color/monochrome, the number of pages, data format, etc.) of the image data obtained by reading the original. The term "attributes" of the image data refers to read setting information that is input by a user together with the instruction for reading.

In step S1105, the MFP generates packaged information (see FIG. 10) that combines command information received in step S1101, image data stored in step S1104, and attributes of the image data. In step S1106, the MFP transmits the packaged information to an MFP designated as an output device.

The MFP having received the packaged information performs printing and post-processing based on a paper size, a layout, the number of copies, post-processing, etc. that is specified by the command information in the packaged information, and based on image data and its attributes.

As described above, in the printing system according to the present embodiment, an MFP having only a simple operation panel can instruct an advanced-function MFP to execute advanced processing.

In the above-described embodiment, command information generated by the user terminal 202 is sent and stored in an MFP designated as an input device as described in step S505 of FIG. 5. However, there is a possibility that the MFP designated as an input device has only a small memory capacity, and therefore, this command information may be stored in the user terminal 202.

In this case, only a command ID corresponding to the generated command information is sent to the MFP designated as an input device in step S505 of FIG. 5. Then, the MFP designated as an input device transmits read image data and attribute information thereof, as well as command ID selected by a user, to the user terminal 202. When the above information is received, the user terminal extracts command information corresponding to the command ID to generate packaged information (print job) based on the image data and attribute information thereof and transfers the generated information to an MFP designated as an output device.

According to the present invention, a storage medium, which stores a computer program code of software for realizing the flowcharts described in the above embodiments can be supplied to a system or an apparatus. The present invention can be embodied by a computer of the system or apparatus (central processing unit (CPU) or micro processing unit (MPU)) reading the program code stored in the storage medium and executing the read program code.

In this case, the program code read from the storage medium realizes functions of the above embodiments, and the storage medium storing the program code is included in the scope of the present invention. Examples of the storage medium for supplying a program code include a floppy disk, a hard disk, an optical disk, a magneto-optic disk, a CD-ROM, a CD-R, a DVD-ROM, a magnetic tape, a nonvolatile memory card, a ROM, and a ROM.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-046296 filed Feb. 26, 2007, which is hereby incorporated by reference herein in its entirety.

What is claimed is:

1. An image forming system comprising an information processing apparatus, an image supply apparatus, and an image forming apparatus;
   the information processing apparatus including:
      a first setting unit configured to set output setting for image formation to be performed by the image forming apparatus; and
      a first transmitting unit configured to transmit the output setting to the image supply apparatus;
   the image supply apparatus including:
      a second setting unit configured to set input setting for image inputting to be performed by the image supply apparatus;
      a receiving unit configured to receive the output setting transmitted by the first transmitting unit;
      an inputting unit configured to input image data in accordance with the input setting set by the second setting unit;
      a display unit configured to display identification information for identifying the output setting;
      a second transmitting unit configured to transmit the output setting identified by the identification information displayed by the display unit, the input setting set by the second setting unit, and the image data input by the inputting unit, to the image forming apparatus; and
   the image forming apparatus including:
      an image forming unit configured to perform the image formation based on output setting transmitted by the second transmitting unit, the input setting transmitted by the second transmitting unit, and the image data transmitted by the second transmitting unit.

2. The image forming system according to claim 1, wherein the image supply apparatus further includes:
   a first storage unit configured to store the output setting, transmitted by the first transmitting unit, in association with the identification information,
   wherein the image supply apparatus transmits output setting, corresponding to the identification information displayed by the display unit stored by the first storage unit, the input setting, and the image data, to the image forming apparatus.

3. The image forming system according to claim 1, wherein the information processing apparatus further includes a second display unit configured to display a selecting screen for causing a user to select the image supply apparatus and the image forming apparatus.

4. The image forming system according to claim 1, wherein the image supply apparatus photoelectrically converts and reads an original image to obtain the image data.

5. The image forming system according to claim 1, wherein the information processing apparatus further includes:
   a display control unit configured to display, on a display unit of the information processing apparatus, an operation screen for setting the output setting for image formation to be performed by the image forming apparatus, wherein the first setting unit sets the output setting by a user operating the operation screen displayed by the display control unit.

6. A method of controlling an image forming system including an information processing apparatus, an image supply apparatus, and an image forming apparatus, the method comprising:

setting output setting, in the information processing apparatus, for image formation to be performed by the image forming apparatus;

transmitting the output setting to the image supply apparatus from the information processing apparatus;

setting input setting, in the image supply apparatus, for image inputting to be performed by the image supply apparatus;

receiving the output setting from the information processing apparatus;

inputting image data in accordance with the input setting in the image supply apparatus;

displaying identification information for identifying the output setting in the image supply apparatus;

transmitting, to the image forming apparatus from the image supply apparatus, the output setting identified by the displayed identification information, the input setting, and the image data; and forming an image in the image forming apparatus based on the output setting, the input setting, and the image data transmitted from the image supply apparatus.

7. An image forming system comprising an information processing apparatus, an image supply apparatus, and an image forming apparatus;

the information processing apparatus including:
a display control unit configured to display, on a display of the information processing apparatus, a common operation screen with the image forming apparatus, wherein in the image forming apparatus, the operation screen is displayed on a display of the image forming apparatus;
a storing unit configured to store setting information for image formation to be performed in the image forming apparatus, the setting information being input by a user using the operation screen displayed by the display; and
a first transmitting unit configured to transmit, the image supply apparatus, identification information for identifying the setting information stored in the storing unit;

the image supply apparatus including:
a second transmitting unit configured to transmit image data which is a supply target, together with the identification information transmitted by the first transmitting unit; and the image forming apparatus including:
a process unit configured to perform image formation of the image data, based on setting information identified by the identification information transmitted from the image supply apparatus.

* * * * *